G. T. TRUNDLE.
CHUCK.
APPLICATION FILED MAY 2, 1910.

1,044,299.

Patented Nov. 12, 1912.

Witnesses
Oliver M. Kappler
Elmer R. Caspell

Inventor
George T. Trundle
By Baker, Fonts & Hull
Attys

UNITED STATES PATENT OFFICE.

GEORGE T. TRUNDLE, OF CLEVELAND, OHIO, ASSIGNOR TO THE AMERICAN MULTIGRAPH COMPANY, OF CLEVELAND, OHIO, A CORPORATION OF OHIO.

CHUCK.

1,044,299.  Specification of Letters Patent.  Patented Nov. 12, 1912.

Application filed May 2, 1910. Serial No. 558,844.

*To all whom it may concern:*

Be it known that I, GEORGE T. TRUNDLE, a citizen of the United States, residing at Cleveland, in the county of Cuyahoga and State of Ohio, have invented a certain new and useful Improvement in Chucks, of which the following is a full, clear, and exact description, reference being had to the accompanying drawings.

This invention relates to chucks for screw machines, lathes, etc., and more particularly to an improved construction of collet which, coöperating with the chuck sleeve, will secure the centering of the work throughout substantially the length of the collet and especially at the ends of the collet, with the result that the work will be accurately centered and be firmly gripped during the operation of the lathe or machine.

One object of the invention is to provide an improved form and construction of collet and coöperating parts for securing the work in place during the operation of the tool. In the accomplishment of this and related objects, the invention may be defined further and more generally as consisting of the means hereinafter fully described and particularly pointed out in the claim.

Figure 1:
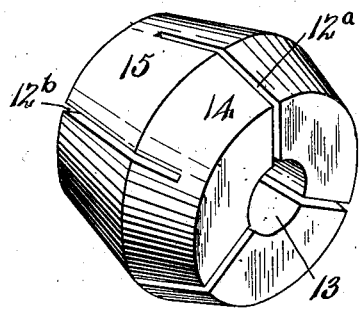
Figure 2:
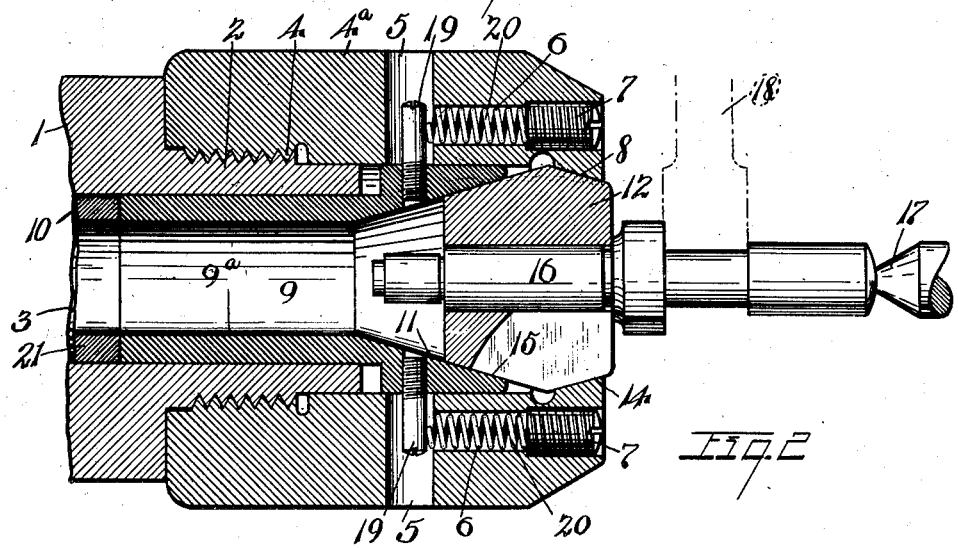
Figure 3:
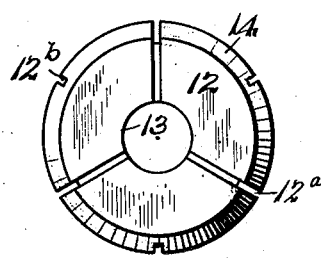

In the drawings forming part hereof, Figure 1 represents a perspective view of a collet constructed in accordance with my invention. Fig. 2 represents a longitudinal sectional view through the end of the head spindle of a lathe, showing the chuck and the collet in section and the work in the elevation. Fig. 3 represents a front elevation of the collet.

Describing the various parts by means of reference characters, 1 denotes the end of the head spindle of the lathe or machine, such spindle being of ordinary construction and provided with a threaded front end, 2, and with a bore, 3. The front end of the head spindle is adapted to receive the chuck, which consists generally of three parts: a chuck head or body, a bushing, and the chuck jaw or collet.

The chuck head consists of a hollow body having an internal thread, 4, at its rear end adapted to engage the threads on the front end of the spindle 1. This body is provided with apertures, 5, extending therethrough and substantially at right angles to the axis of the body, the apertures being located in front of the end of the spindle. The body is also provided with apertures, 6, extending at right angles from the apertures 5 and through the front end of the body, the latter apertures being provided at their outer ends each with an internal thread for the reception of a screw plug 7. At its front end, the bore of the chuck head is tapered inwardly, as shown at 8, whereby the bore is contracted at such end. The collet, however, may be used without any tail piece or centering support 17, the work being fed through the collet.

9 denotes the sleeve or bushing of the chuck. This sleeve or bushing is provided with a cylindrical guiding and operating portion, 10, which is adapted to fit within the bore of the head spindle 1. The front end of the sleeve or bushing is enlarged, so as to fit within the bore of the chuck head 4$^a$, and this enlarged front end is provided with an outwardly flaring bore 11, merging with the bore 9$^a$.

The collet which coöperates with the sleeve or bushing 9 and the head 4$^a$ consists of a sleeve 12 having a cylindrical bore 13 and having its opposite ends reversely tapered, as shown at 14 and 15. The length of the front tapered end 14 is less than that of the rear tapered end, 15, but the inclination of both tapered ends is shown as the same, although such identity of inclination is not essential. The length of the front tapered end is shown as sufficient to allow the front of the collet to project slightly beyond the front end of the head 4$^a$, and the inclination of the surfaces 14 and 15 will be governed by the inclination of the tapered bore of the head 4$^a$ and the tapered bore 11 of the sleeve or bushing 9.

The work 16 is shown as applied to the collet, the work being centered by the collet so as to be in position to be engaged by the centering support 17, and is shown as being operated upon by a tool 18. The collet, however, may be used without any tail piece or centering support 17, the work being fed through the collet.

In operation, the chuck is assembled in a well-known manner by inserting the sleeve or bushing 10 into the end of the spindle 1, applying the collet to the flared end of the sleeve or bushing and securing the head 4$^a$ in place. When the parts are thus assembled, pins, 19, are screwed into the enlarged end of the sleeve, through the apertures 5. The springs, 20, are inserted into the apertures 6, and the tension of these springs is adjusted by means of the screw-plugs 7. The work is inserted into the bore of the collet, which is provided with slits 12ª, 12ᵇ, extending inwardly respectively from the front and the rear ends of the collet. The slits 12ª terminate a short distance from the rear end of the collet and the slits 12ᵇ terminate a short distance from the front end of the collet, and the slits 12ª are staggered with respect to the slits 12ᵇ. The sleeve or bushing 9 is adjusted forwardly by an abutting sleeve 21 operated by means well-known in the art to which this invention relates, with the result that the inclined surface 11 of the sleeve rides up the inclined surface 15 of the collet, at the same time forcing the collet forwardly with its inclined front surface 14 in engagement with the corresponding tapered bore 8 of the head 4ª. This action causes the collet to be compressed practically uniformly throughout its entire length, with the result that the work is firmly gripped. It will be evident that the ends of the collet will be compressed against the work, and this insures the work being accurately centered by the collet in position to be engaged by the centering support 17, without necessity for adjustment. When it is desired to remove the work, it is only necessary to remove the pressure of the sleeve 21 from the rear end of the sleeve or bushing 9, whereupon the springs 20 will force the latter inwardly, unclamping the collet and allowing the work to be withdrawn.

When a collapsible member like the collet shown herein is provided with reversely inclined ends, with a correspondingly tapered fixed member adapted to engage one end and a correspondingly tapered movable member adapted to engage the other end, there is apparently a tendency for the collet to adjust itself with reference to the fixed member before there is a chance for it to adjust itself with reference to the movable member, as well as for the end which is engaged by the fixed member to be closed somewhat in advance of that which is engaged by the movable member. In a chuck construction, such as is shown herein, it is more difficult to provide an exact centering of the inclined surface 8 of the head than to provide an accurate centering of the inclined surface of the movable sleeve or bushing. This is due to the fact that the central position of the latter can be accurately maintained by the positive guiding of the sleeve in the spindle while such accuracy of centering can not be insured in a member which is adjusted by threading. To offset the tendency of the collet to be centered by the relatively fixed member or head, which is apt to be somewhat inaccurately centered, as well as to cause the end of the collet which is engaged by the sleeve to close at least as quickly as the offset end, I make the surface 15 longer than the surface 14 and provide a longer bearing for the movable member on the collet than for the fixed member on the same. This results in accurately centering the collet with respect to the member 9 and thus insures the accurate centering of the work.

Other modes of applying the principle of my invention may be devised, change being made as regards the mechanism herein disclosed, provided that the means stated by the following claim or the equivalents of such means be employed.

Having described my invention, I claim:

In a mechanism of the character described, the combination of a rotary spindle having a bore, a tubular member slidably mounted in said bore and having at its forward end an outwardly flaring bore with a cylindrical exterior, a head screw threaded on the spindle and extending over the flaring end of the slidable member and beyond said member formed with a bore tapered reversely to that of the member, a pin projecting outwardly from the flaring end of the slidable member into an opening in the head, a spring carried by the head bearing against said pin, a collet reversely tapered and engaged by the bores of the slidable member and the head, said collet being split from opposite ends by kerfs extending beyond each other, and means within the spindle adapted to shove on the rear end of the slidable member.

In testimony whereof, I hereunto affix my signature in the presence of two witnesses.

GEORGE T. TRUNDLE.

Witnesses:
 ALBERT H. BATES,
 A. J. HUDSON.